Aug. 6, 1935.    L. WILLEME    2,010,617

MOUNTING OF WHEELS FOR VEHICLES RUNNING ON ROADS AND ON RAILS

Filed Jan. 5, 1933

L. Willeme
INVENTOR

By: Marks & Clerk
ATTYS.

Patented Aug. 6, 1935

2,010,617

UNITED STATES PATENT OFFICE 2,010,617

MOUNTING OF WHEELS FOR VEHICLES RUNNING ON ROADS AND ON RAILS

Louis Willeme, Nanterre, France, assignor to Société pour l'Exploitation de Brevets de Roues Automobiles (Sebra), Paris, France, a corporation of France Application January 5, 1933, Serial No. 650,334
In France August 29, 1932

1 Claim. (Cl. 295—8.5)

The invention relates to a method of mounting wheels for vehicles running on roads and on rails, and is essentially characterized by the provision, at each axle end, of a metal wheel adapted to run on rails, and a wheel which is adapted to the aforesaid wheel, is provided with a rubbered tire or pneumatic tire and is adapted to run on roads. This second wheel has a greater diameter than the first wheel so that the latter does not bear on the ground of the roads.

The wheel for running on roads is preferably constituted like a detachable rim of any ordinary twin automobile wheel, that is to say, it is adapted to be removed for example when running on rails, although this is not indispensable in every case.

The fixing of the detachable rim on the metal wheel may be effected in any known manner without departing from the scope of the invention.

By way of example, it will be mentioned that this fixing may be effected by means of a device substantially comprising a split ring or segment which has a conical internal surface and is applied to the interior of the rim under the action of clamping elements which are carried by the fixed wheel and are provided with conical surfaces acting on the corresponding surface of the split ring.

A constructional form of the invention comprising the above-mentioned method of fixing is shown in the accompanying drawing.

Figure 1:
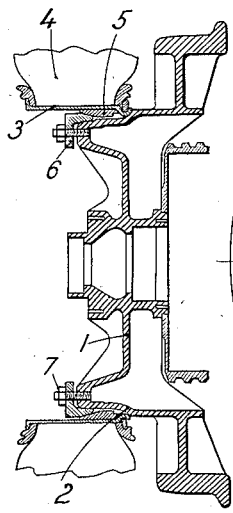
Figure 1 is an axial section of the wheel.
Figure 2:
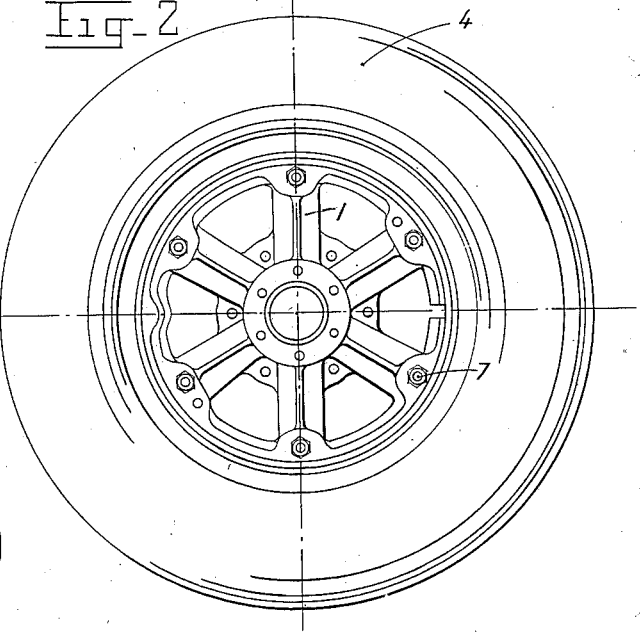
Figure 2 is a front view of the exterior.

The metal wheel 1 shown in the drawing is in one piece including a hub, a plate and the rail engaging rim. The plate is provided with a circular series of lateral extensions 2 offset between the outer surface thereof and around which is arranged the detachable rim 3, in the position shown in Figure 1, with its inner tube and pneumatic tire 4. The fixing of the detachable rim 3 is effected by means of the split ring 5 which has an internal conical surface acted upon by the corresponding conical surfaces of clamping elements 6 which are fixed by the bolts 7.

The removal of the detachable part is effected very simply by unscrewing of the bolts 7, and its replacement is effected by the inverse operation.

Figure 3:
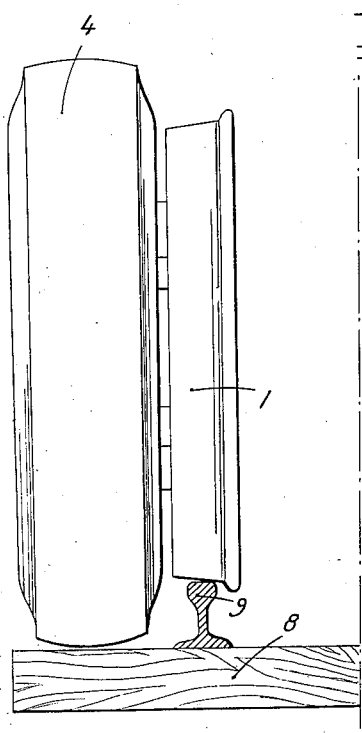
Figure 3 is a view of two opposite wheels of a vehicle, one being shown with the detachable part provided for running on roads and the other being shown without this part.
Figure 3:
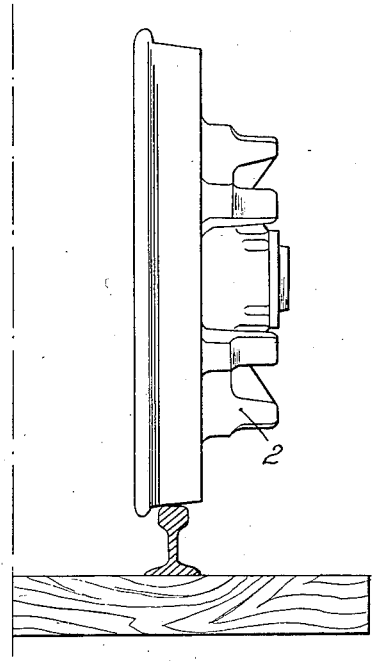

When the vehicle is running on rails, the wheel for running on the road may be removed, and the end of the axle will then have an appearance like that shown in the right hand portion of Figure 3. When, on the contrary, the vehicle is running on roads, the end of the axle has the appearance shown in the left hand portion of Figure 3.

The change-over from running on rails to running on roads is effected very simply by means of an inclined portion 8 of the road which rises gradually relatively to the surface of the rails 9, so that the load is carried progressively by the pneumatic tires 4 and ceases to be carried by the metal tires of the wheels 1.

I claim:

A device for a vehicle running on roads and on rails comprising a one-piece metal railway-wheel including a hub, a plate and a rail engaging rim, a circular series of lateral extensions offset from the outer face of the plate, a detachable road rim adapted to receive a tire having a cylindrical internal peripheral surface disposed around said extensions, the extensions being sufficient to avoid contacting of the tire and the rail wheel, having a peripheral inward projection at the inner edge, a split ring interiorly of said rim for pressing against it when extended and having a conical surface and adjustable and detachable means interposed between the conical surface of said ring and said extensions for wedging and extending said ring and fastening said ring to said extensions.

LOUIS WILLEME.